(12) United States Patent
Deboy et al.

(10) Patent No.: US 10,135,346 B2
(45) Date of Patent: Nov. 20, 2018

(54) POWER SUPPLY REGULATION AND BIDIRECTIONAL FLOW MODE

(71) Applicant: Infineon Technologies Austria AG, Villach (AT)

(72) Inventors: Gerald Deboy, Klagenfurt (AT); Kenneth K. Leong, Villach-Warmbad (AT); Giuseppe Bernacchia, Villach (AT); Arash Pake Talei, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/170,008

(22) Filed: Jun. 1, 2016

(65) Prior Publication Data
US 2017/0353114 A1    Dec. 7, 2017

(51) Int. Cl.
*H02M 3/335* (2006.01)
*H02M 1/08* (2006.01)
*H02M 1/32* (2007.01)

(52) U.S. Cl.
CPC ......... *H02M 3/33523* (2013.01); *H02M 1/08* (2013.01); *H02M 1/32* (2013.01); *H02M 3/33576* (2013.01)

(58) Field of Classification Search
CPC ......... H02M 3/33523; H02M 3/33576; H02M 3/33592
USPC ..................... 363/21.12–21.15, 21.17, 21.18
See application file for complete search history.

(56) References Cited

U.S. PATENT DOCUMENTS

| | | | |
|---|---|---|---|
| 2005/0024896 A1* | 2/2005 | Man-Ho | H02M 3/33592 363/21.04 |
| 2008/0137379 A1* | 6/2008 | Mao | H02M 3/157 363/17 |
| 2014/0043863 A1* | 2/2014 | Telefus | H02M 3/33592 363/17 |
| 2014/0268901 A1* | 9/2014 | Telefus | H02M 3/33576 363/21.01 |

* cited by examiner

*Primary Examiner* — Gary Nash
(74) *Attorney, Agent, or Firm* — Chapin IP Law, LLC

(57) ABSTRACT

A power converter circuit includes a transformer. The transformer includes a primary winding and a secondary winding. The power converter circuit uses energy conveyed from the primary winding of the transformer through the secondary winding of the transformer to produce an output voltage to power a load. Control circuitry of the power converter circuit initiates conveying a portion of the received energy through the secondary winding back through the primary winding to control a magnitude of the output voltage. For example, if the magnitude of the output voltage is above a desired setpoint value, such as due to a transient load condition or change in the setpoint of the output voltage, the control circuitry reduces the magnitude of the output voltage by conveying excess energy from an output capacitor (that stores the output voltage) through the secondary winding to the primary winding.

36 Claims, 10 Drawing Sheets

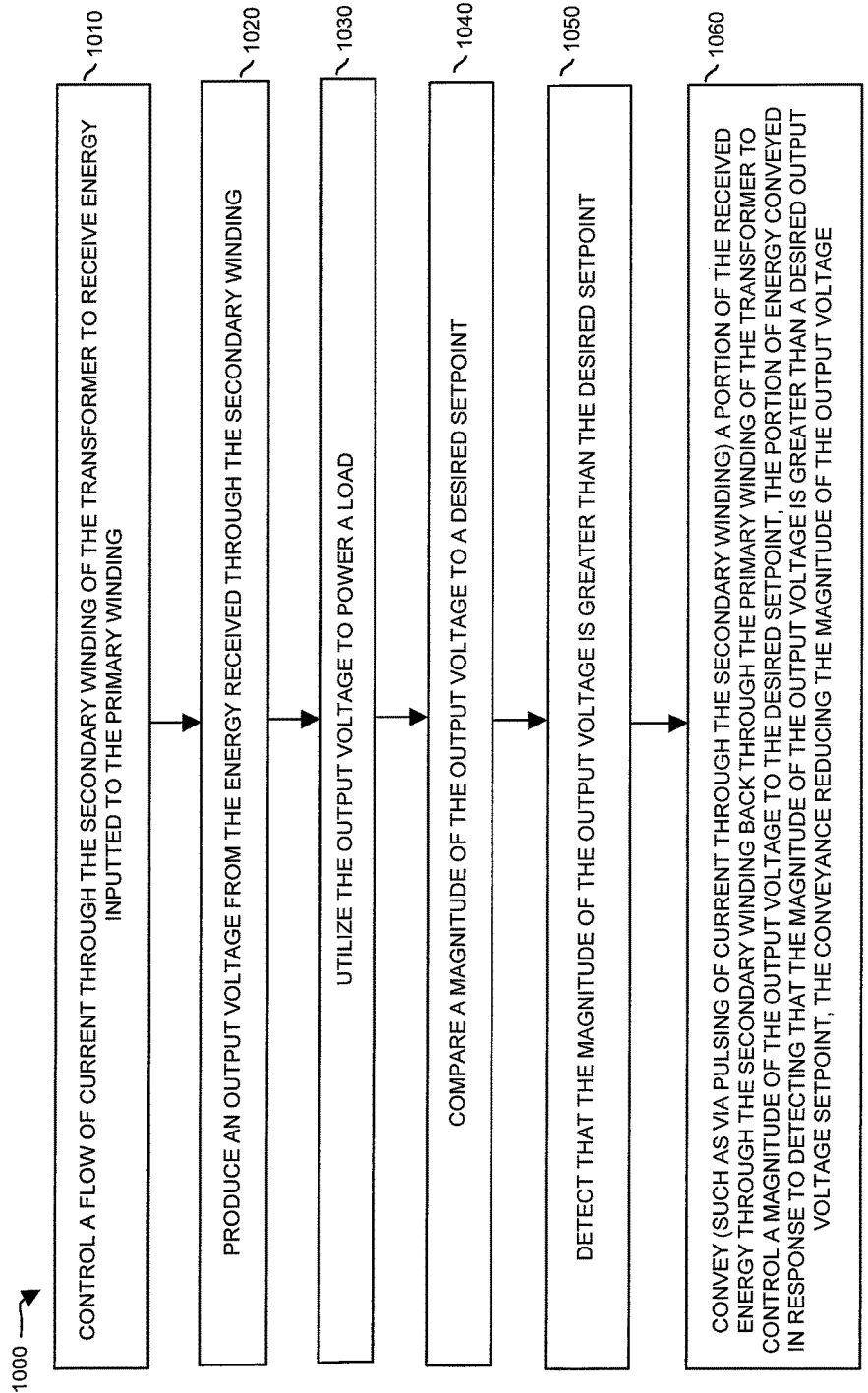

POWER SUPPLY REGULATION AND BIDIRECTIONAL FLOW MODE

BACKGROUND

A typical flyback converter includes a primary side circuit, a transformer, and a secondary side circuit. The primary side circuit is connected to a power source and includes at least one switching element that controls the amount of energy transferred to the secondary side through the transformer. The transformer serves as an electrically isolated channel to transfer energy from the primary side circuit to the secondary side circuit. The secondary side circuit powers a load using the received energy.

In general, a classic flyback converter (using a secondary side rectification diode) is a unidirectional device. For example, energy is conveyed through the transformer from a primary winding to a secondary winding to produce an output voltage that powers a load. In the event that the load instantaneously consumes less power, the magnitude of the output voltage may spike or overshoot. This is an undesirable because the over-voltage condition, even if temporary, may cause damage to a respective load (circuit) being powered.

BRIEF DESCRIPTION

One way to prevent or control an over-voltage condition is to dissipate respective excess energy received through the transformer in order to control the magnitude of the output voltage within a desired range. For example, when the magnitude of the output voltage exceeds a desired limit, because the respective load instantaneously consumes less current, the excess energy can be dissipated through a resistive load to reduce the magnitude of the output voltage to be within a tolerable range again.

This disclosure includes the observation that the magnitude of an output voltage derived from energy received through a transformer can be controlled via conveyance of excess energy in a reverse direction through the transformer back to a source.

More specifically, a power converter circuit according to embodiments herein includes a transformer comprising a primary winding and a secondary winding. The power converter circuit further includes control circuitry. During operation, the control circuitry controls conveyance of current through the primary winding and the secondary winding. For example, in a forward direction from the primary winding to the secondary winding, the control circuitry initiates conveyance of energy from the primary winding of the transformer to the secondary winding of the transformer. The energy received through the windings of the transformer is used to produce an output voltage to power a respective load.

According to embodiments herein, in response to detecting a condition in which the magnitude of the output voltage falls outside of a desired output range, to maintain the magnitude of the output voltage within the desired range, the control circuitry initiates conveyance of a energy in a reverse direction through the transformer such as through the secondary winding to the primary winding. In one embodiment, the primary winding is coupled to storage device such as a respective input capacitor circuit. The excess energy conveyed in the reverse direction to the transformer is stored in the input capacitor circuit until the energy is later needed to produce the output voltage to power the load.

When needed, the control circuitry operates to convey the energy stored in the respective input capacitor circuit in a forward direction through the transformer to power the load. For example, in accordance with further embodiments, the control circuitry controls a flow of current through the primary winding and the secondary winding of the transformer to convey the energy in the forward direction through the transformer to power the load.

Additionally, as previously discussed, to maintain the magnitude of the output voltage within a desired range, the control circuitry conveys the portion of the received energy (such as excess energy) through the secondary winding back through the primary winding of the transformer to reduce the magnitude of the output voltage.

In one embodiment, the control circuitry is a single circuit operable to control current through the primary winding in the secondary winding. The control circuitry monitors the magnitude of the output voltage. As previously discussed, in response to detecting that the magnitude of the output voltage is above the desired threshold set point value, the control circuitry initiates conveyance of the excess energy through the secondary winding and the primary winding to an input capacitor circuitry.

In alternative embodiments, the control circuitry is split into first control circuitry (such as a primary controller) and second control circuitry (such as a secondary controller). The first control circuitry controls current through the primary winding; the second control circuitry controls current through the secondary winding. During operation, the second control circuitry communicates feedback through the windings of the transformer to notify the first control circuitry how much energy to convey in the forward direction to maintain the magnitude of the output voltage within a desired range. When the second control circuitry detects the over-voltage condition with respect to the magnitude of the output voltage, subsequent to receiving the energy through the secondary winding in the forward energy transfer mode, the second control circuitry provides notification to the first control circuitry to discontinue inputting energy to the primary winding. Subsequent to notifying the primary control circuitry of the change in mode direction, the secondary control circuitry conveys excess energy through the secondary winding back to the primary winding.

One application in which to implement the power converter circuit according to embodiments herein is a variable output voltage charger device. The output voltage of the charger device can be controlled to accommodate charging or powering at different voltage levels. Conveyance of excess energy in a reverse direction through the transformer as previously discussed, whether caused by a transient load condition or a change in a respective set point voltage, provides an efficient way of controlling the magnitude of the output voltage.

Embodiments herein provide advantages over conventional techniques. For example, as previously discussed, one way to maintain a respective output voltage within a desired range is to dissipate the excess energy. However, this is undesirable because the dissipated energy can no longer be used to power the respective load. In contrast, embodiments herein provide a unique way of conveying the excess energy in a reverse direction through the transformer and at least temporarily storing the excess energy for later use.

These and other more specific embodiments are disclosed in more detail below.

Note that embodiments as discussed herein are applicable to transformer circuitry and corresponding power converter circuits. However, note that the concepts disclosed herein are applicable to any other suitable technologies as well.

Note that further embodiments herein can include a controller configuration of computer processor hardware to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program logic encoded thereon that, when performed in a computerized device having a processor and corresponding memory, programs the processor to perform any of the operations disclosed herein. Such arrangements are typically provided as software, code and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling energy transfer modes through a transformer. For example, in one embodiment, the instructions, when carried out by computer processor hardware, cause the computer processor hardware to: receive energy conveyed from a primary winding of a transformer through a secondary winding of the transformer; produce an output voltage from the energy received through the secondary winding; and convey a portion of the received energy through the secondary winding back through the primary winding to control a magnitude of the output voltage.

The ordering of the steps has been added for clarity sake. These steps can be performed in any suitable order.

It is to be understood that the system, method, device, apparatus, etc., as discussed herein can be embodied strictly as hardware, as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 9-10 are example diagrams illustrating methods according to embodiments herein.

DETAILED DESCRIPTION

Figure 1:
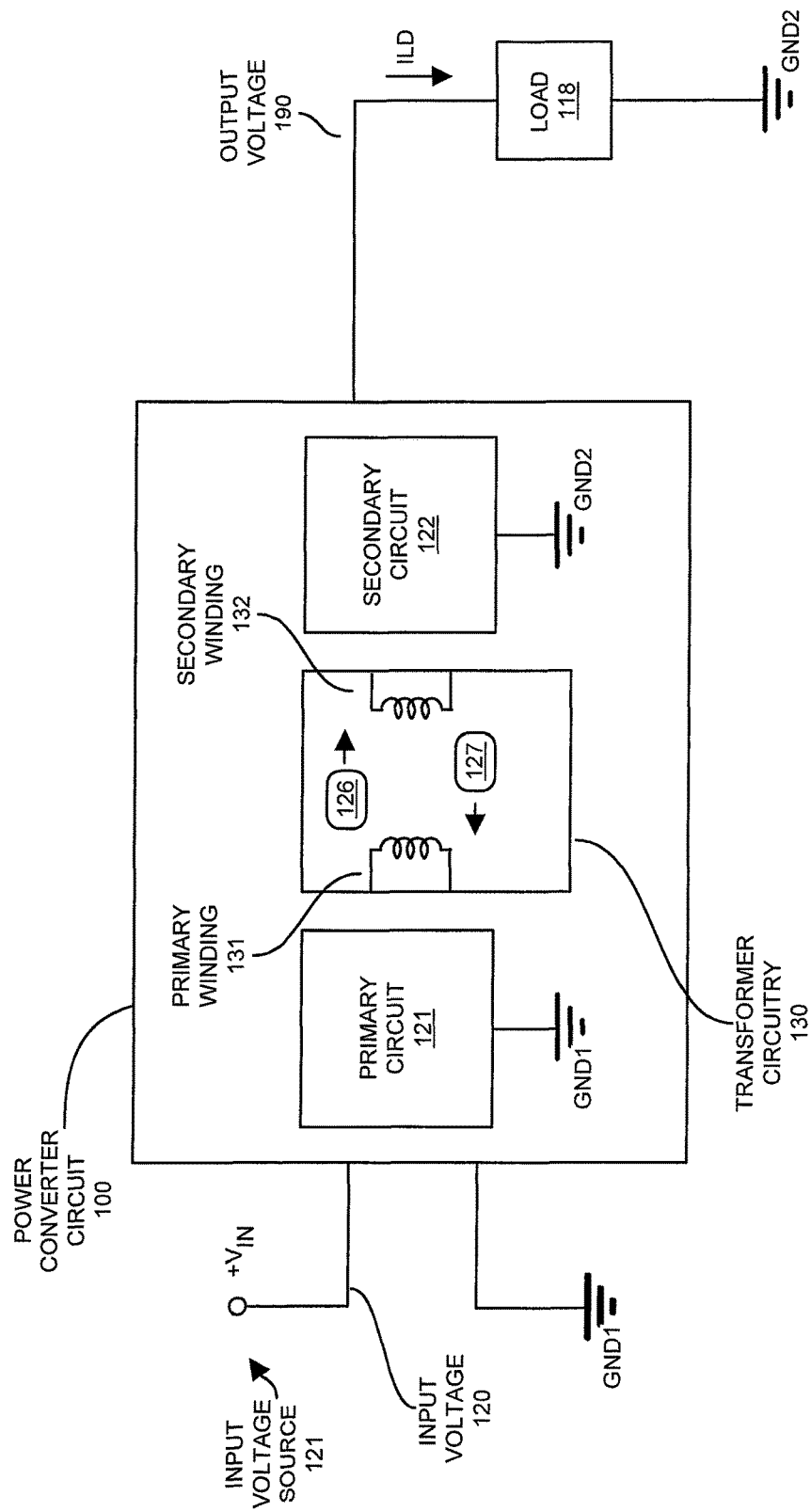
FIG. 1 is an example general diagram of a power converter circuit according to embodiments herein.

Now, more specifically, FIG. 1 is an example diagram of a power converter circuit according to embodiments herein.

As shown in this embodiment, the power converter circuit 100 includes primary (side) circuit 122, transformer circuitry 130, secondary (side) circuit 124. Transformer circuitry 130 includes primary winding 131 and secondary winding 132.

In one embodiment, transformer circuitry 130 is a so-called air gap transformer in which the transformer circuitry 130 stores energy received through the primary winding 131 for subsequent conveyance through the secondary winding 132. However, note that the transformer circuitry 130 can be any suitable type of transformer or device.

In accordance with further embodiments, during operation, power converter circuit 100 receives input voltage 120 from input voltage source 121. As its name suggests, the power converter circuit 120 converts the input voltage 120 into output voltage 190 to power dynamic load 118 (such as a variable current consumption load, variable power consumption load, etc.).

More specifically, to convert the input voltage 120 into the output voltage 190, the primary circuitry 121 of power converter circuit 100 inputs energy 126 (as derived from input voltage 120 and corresponding flow of current) through the primary winding 131 of transformer circuitry 130. The secondary circuit 122 receives the energy 126 through the secondary winding 132 of the transformer circuitry 130.

The secondary circuit 122 uses the energy 126 transmitted in a forward direction through the transformer circuitry 130 from the primary winding 131 to the secondary winding 132 to produce the output voltage 190. For example, in one embodiment, the secondary circuit 122 (or other suitable resource) monitors the magnitude of output voltage 190 and controls it to be within a desired voltage range or at a desired voltage level.

In one embodiment, the load 118 is susceptible to transient conditions. For example, the current consumed by the load, ILD, can instantaneously change. Additionally or alternatively, a setpoint voltage in which to control the magnitude of the output voltage 190 can change as well. If possible, control circuitry (whether in the primary circuit 121 and/or the secondary circuitry 122) adjusts an amount of energy conveyed in the forward direction to the transformer circuitry 130 to maintain the output voltage 190 within a desired range.

In certain instances, merely reducing the amount of energy conveyed in the forward direction through the transformer circuitry 130 may not be sufficient to accommodate a transient current consumption condition and/or change in the desired setpoint voltage. As previously discussed, embodiments herein include conveying energy 127 (such as excess energy) in a reverse direction through the transformer circuitry 130 (i.e., from the secondary winding 132 to the primary winding 131) to maintain the magnitude of the output voltage at a desired level or within a desired range.

More specifically, in accordance with additional embodiments, in response to detecting a condition in which the magnitude of the output voltage 190 is greater than a setpoint threshold value, and in order to maintain the magnitude of the output voltage 190 at the desired voltage level or within the desired range, respective control circuitry initiates conveyance of a portion of the previously received energy 126 (such as excess energy 127) in a reverse direction through the secondary winding 132 and primary winding 131 of the transformer circuitry 130 to primary circuit 121.

In one embodiment, the primary circuit 121 includes an energy storage resource such as a capacitor circuit (of one or more capacitors) to store the received energy 127. The excess energy (such as energy 127) received in the reverse direction through the transformer circuitry 130 is stored in the capacitor circuit of the primary circuit until such energy 127 is later needed and forwarded through the transformer circuitry 130 to the secondary circuit 122 to produce the output voltage to power the load.

Accordingly, conveyance of energy in a reverse direction through the transformer circuitry 130 provides a way of regulating the magnitude of the output voltage 190 outputted from the power converter circuit 100.

Note that each of the primary circuit 121 and the secondary circuit 122 can include any suitable analog circuitry, digital circuitry, or a combination of both. Additionally, each of the primary circuit 121 and secondary circuit 122 can be or include a computer, processor, micro-controller, digital signal processor, etc., configured to carry out and/or support any or all of the method operations disclosed herein.

Note further that embodiments herein can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or media) including computer program logic (e.g., software, firmware, instructions, . . . ) encoded thereon that, when performed in the respective circuit having a processor and corresponding storage, programs the circuit to digitally perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in or may be accessible to the respective circuits to perform the techniques explained herein.

Accordingly, in addition to hardware and/or firmware, embodiments of the present disclosure are directed to a computer program product that includes a non-transitory computer readable medium (e.g., memory, storage repository, optical disk, integrated circuit, etc.) to execute any of the operations as described herein.

Figure 2:
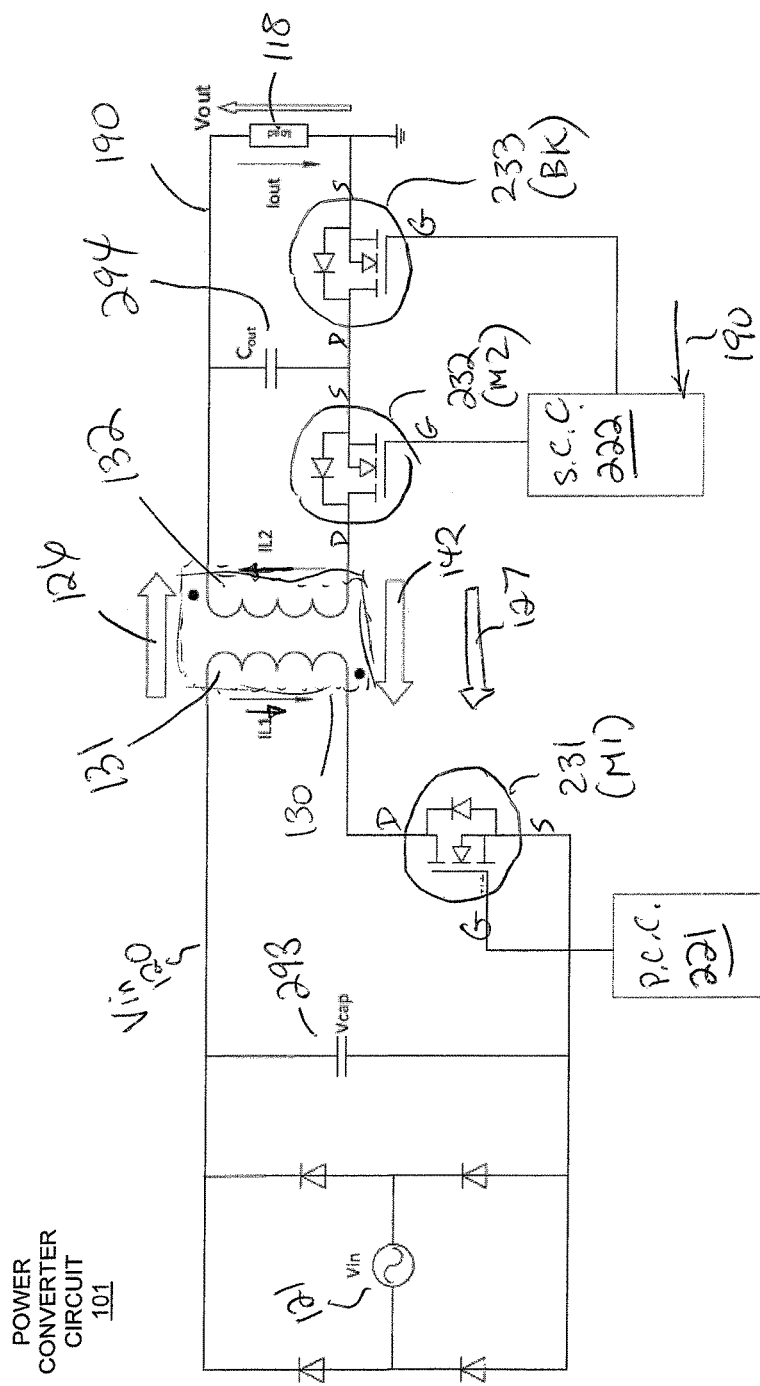
FIG. 2 is an example detailed diagram illustrating a power converter circuit including a transformer and corresponding circuitry according to embodiments herein.

FIG. 2 is an example diagram illustrating more specific details of a power converter circuit including a transformer and corresponding circuitry according to embodiments herein.

In this example embodiment, power converter circuit 101 includes transformer circuitry 130 including primary winding 131 and secondary winding 132. Power converter circuit 101 further includes multiple controllers—primary control circuitry 221 disposed and secondary control circuitry 222. As further shown, the primary control circuit 221 controls operation of switch circuitry 231. The secondary control circuit 222 controls operation of switch circuitry 232 and switch circuitry 233.

Note that the switch circuitry 231 can be or include any suitable type of switch devices. In one embodiment, the switch circuitry 231 is a field effect transistor. However, that the switch circuitry 231 can be any suitable device or combination of devices that control a flow of current through the primary winding 131.

Similarly, the switch circuitry 232 and/or switch circuitry 233 controlled by secondary control circuit 222 can be or include any suitable type of one or more switch devices to control a flow of current through the secondary winding. In one embodiment, the switch circuitry 232 is a field effect transistor. However, as mentioned, the switch circuitry 232 and/or switch circuitry 233 can include any suitable device to control current flow.

During operation, and conveyance of energy 126 in a forward direction through the transformer circuitry 130, activation of the switch circuitry 231 (that is, turning switch circuitry 231 to an ON state) causes current to flow through the primary winding 131 as received from input voltage 120. In one embodiment, the input voltage 120 (such as a DC voltage is derived from the rectification of the AC voltage outputted from voltage source 121 (such as power from a wall receptacle) and provides the energy 126 to input into the primary winding 131.

Note that the input voltage 120 can be received and/or derived from any suitable resource. In one embodiment, the input voltage 120 is a substantially DC voltage with AC ripple derived from full-wave rectification of an AC signal (such as a 120 volt AC power signal from a wall receptacle, or Vin). Accordingly, the input voltage 120 can be susceptible to having anywhere from minimal to substantial ripple voltage.

Note further in this example embodiment that the primary control circuitry 221 and corresponding circuitry is connected to a first ground reference voltage, GND1. The secondary control circuitry 222 and corresponding circuitry is connected to a second ground reference voltage, GND2. Transformer circuitry 130 provides voltage isolation between the primary circuit 121 and the secondary circuit 122. The voltage potential difference between GND1 and GND2 may be 0 volts, 10s of volts, 100s of volts, etc.

There may be substantial differences associated with ground reference voltage GND1 and ground reference voltage GND2 over time. In other words, one ground reference voltage may be floating with respect to the other ground reference voltage. The differences (and potentially varying differences) between the ground reference voltages can render it challenging to support communications between the secondary control circuitry 222 and primary control circuitry 221, and vice versa.

As previously discussed, use of one or more opto-coupler devices is one option for supporting communications between circuits referenced to different ground potentials. However, use of such devices is undesirable because it increases the cost of the power converter circuit 100 as well as requires more circuit board space to fabricate the power converter circuit 100.

During the forward energy transfer mode, embodiments herein include providing feedback 142 through the transformer circuitry 130 to notify the primary controller circuitry 221 how much energy to forward from the primary winding 131 to the secondary winding 132 to maintain the output voltage 190 at a desired setpoint (voltage level).

As its name suggests, the dynamic load 118 is susceptible to consuming a varying amount of current over time. In this embodiment, the feedback 142 (one or more pulses over time) includes state information indicating one of multiple levels of energy to inputted into the primary winding 131 to maintain the output voltage 190 within a desired range. During a condition in which the load 118 consumes more and more current over time, in which a magnitude of the output voltage may be dropping, the feedback 142 conveyed to the primary control circuitry 221 can indicate to the primary control circuitry 221 to input a greater amount of energy into the primary winding 131 during a next input cycle to account for the increase in current consumption.

Conversely, during a condition in which the load 118 consumes less current overtime, in which a magnitude output voltage may be increasing, the feedback 142 conveyed to the primary control circuitry 221 can indicate to the primary control circuitry 221 to input a lesser amount of energy into the primary winding 131 on one or more next input cycles to account for a decrease in current consumption.

Additional details of implementing feedback 142 and control of the output voltage 190 are discussed in related application U.S. Provisional Patent Application Ser. No. 62/299,146 entitled "POWER SUPPLY SYSTEMS AND FEEDBACK THROUGH A TRANSFORMER,", filed on Feb. 24, 2016, the entire teachings of which are incorporated herein by this reference. Note further that this prior filed patent application describes multiple embodiments—a first embodiment describes a variable on time method of providing different feedback 142 through a transformer circuitry 130 as well as second embodiment of controlling switching frequency, pulse widths, etc. Embodiments of the present disclosure can be applied to any of the different embodiments in this prior filed application.

As previously discussed, there are certain instances in which merely reducing the amount of energy conveyed in the forward direction through the transformer circuitry 130 does not accommodate a transient current consumption condition and/or change in the desired setpoint voltage. As previously discussed, embodiments herein include conveying energy 127 (such as excess energy) in a reverse direction through the transformer circuitry 130 (i.e., from the secondary winding 132 to the primary winding 131) to regulate the output voltage 190 and maintaining it at a desired level.

As a specific example, assume that the secondary control circuitry 222 detects a condition in which the magnitude of the output voltage 190 is sufficiently greater than a desired output voltage set point. As previously discussed this can be caused by a transient load condition in which the dynamic load 118 instantaneously consumes less current and/or a condition in which the desired output voltage setpoint changes from the high voltage to a lower voltage. Embodiments herein include a way to provide a fast response for maintaining the output voltage at the desired output voltage set point. Further details of providing a fast response of maintaining the output voltage are discussed in the following figures.

Figure 3:
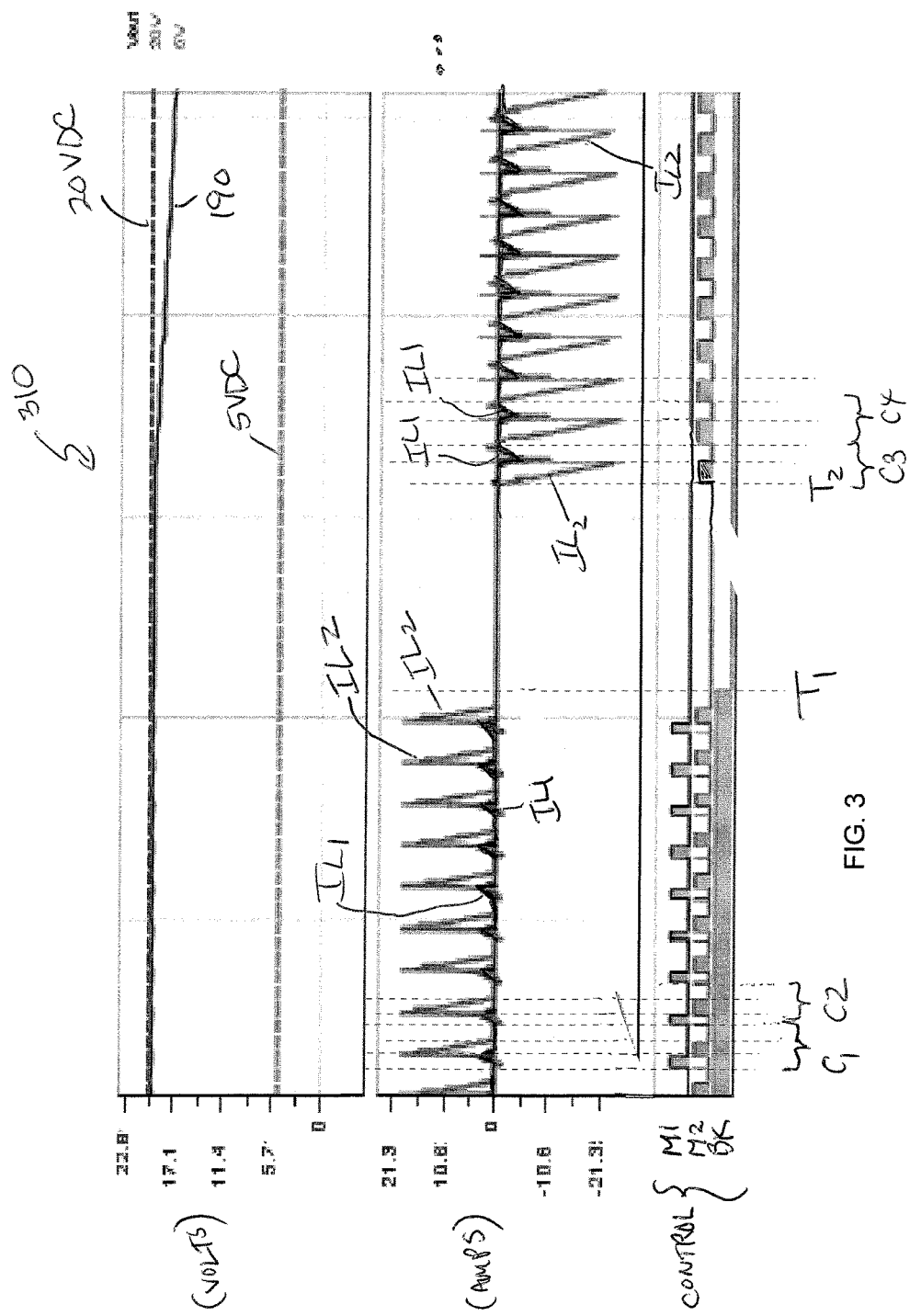
FIG. 3 is an example timing diagram illustrating transition of operating a power converter circuit from a forward energy transfer mode to a reverse energy transfer mode according to embodiments herein.

FIG. 3 is an example timing diagram illustrating transition from a forward energy transfer mode to a reverse energy transfer mode through transformer circuitry according to embodiments herein. Note that the discussion in FIG. 3 will include references to components of the power converter circuit 101 as described in FIG. 2.

As shown, prior to time T1, secondary control circuitry 222 activates switch circuitry 233 such that the voltage on output capacitor circuitry 294 provides current to power the load 118. The energy 126 received over multiple cycles C1, C2, etc., through the transformer circuitry 130 replenishes the energy stored in output capacitor circuitry 290 as the load 118 consumes it. As previously discussed, in this embodiment, the secondary control circuit 222 produces feedback 142 in order to maintain the magnitude of the output voltage 190 at 20 volts.

Also, prior to time T1, the power converter circuit 100 operates in a forward energy transfer mode in which discrete quanta of energy transferred through the transformer circuitry 130 are used to produce the output voltage 190 to power the load 118. As described in the above related provisional patent application, each switching cycle in the forward energy transfer mode (such as prior to time T1) includes control of current IL1 through the primary winding 131 via activation of switch circuitry 231 for an appropriate amount of time. Subsequent to deactivation of the switch circuitry 231, on a next portion of a respective energy transfer cycle, the secondary control circuit 222 activates switch circuitry 232 for an appropriate duration to replenish the energy stored in the output capacitor circuitry 294 and/or provide current to the load 118. In other words, activation of switch circuitry 232 conveys energy stored in the transformer circuitry 130 to the output capacitor circuitry 294 or load 118.

Accordingly, prior to time T1, the primary control circuitry 221 pulses current through the primary winding 131 to convey the energy 126 to the secondary winding 132. The secondary control circuitry 222 receives the energy 126 through the secondary winding 132 to increase the magnitude of the output voltage 190 to a desired setpoint voltage level.

At or around time T1, assume that the secondary control circuit 222 receives input indicating a change in the setpoint voltage from 20 V down to 5 V. In such an instance, there is a substantial amount of excess energy stored in the output capacitor circuitry 294. In order to expediently regulate the output voltage 190 at 5 VDC instead of 20 VDC, embodiments herein include switching from operating in the forward energy transfer mode as discussed above to operating in a reverse energy transfer mode.

Further, as previously discussed, the reverse energy transfer mode includes conveying energy 127 stored in output capacitor circuitry 294 in a reverse direction back through the transformer circuitry 130 for storage in input capacitor circuitry 293. Accordingly, embodiments herein include conveying a portion (such as energy 127) of the previously received energy 126 through the secondary winding 132 back to the primary winding 131 in response to detecting that the magnitude of the output voltage 190 is greater than a desired voltage regulation setpoint (such as based on new setpoint 5 VDC).

As previously discussed, prior to time T1, the secondary control circuit 222 provides feedback 142 at the end of each switching cycle to the primary control circuit 221. In one embodiment, to change modes, secondary control circuitry 222 provides notification to the primary control circuitry 221 to discontinue inputting energy 127 into the primary winding 131 because the output voltage 190 of around 20 VDC is substantially greater than the new setpoint output voltage value of 5 VDC. The power converter circuit 101 operates in the reverse energy transfer mode to expediently regulate at the 5 VDC setpoint.

The notification provided by the secondary control circuit 222 to operate in the reverse energy transfer mode can be provided in any suitable manner. In one embodiment, at or around time T1, in furtherance of maintaining the magnitude of the output voltage at the new setpoint of 5 V DC, the secondary control circuitry 222 discontinues transmitting pulses of feedback 142 through the secondary winding 132 to the primary winding 131 in order to notify the primary control circuitry 221 of the mode change to the reverse energy transfer mode in which the second control circuitry 222 subsequently conveys energy 127 through the secondary winding 132 back to the primary winding 131.

Additionally, note that at or around time T1, the secondary control circuit 222 deactivates switch circuitry 233 (BK) so that the output voltage 190 on output capacitor circuitry 294 no longer powers the load 118.

Between time T1 and time T2, the secondary control circuitry 222 discontinues providing the pulses of feedback 142. The primary control circuitry 221 can be configured to monitor and/or count the number of cycles in which no feedback 142 is received. In one non-limiting example embodiment, upon detecting lack of receiving feedback 142 for a predetermined number (such as 5) of consecutive cycles, the primary control circuitry 221 knows to operate in the reverse energy transfer mode.

Additionally, at time T1, in response to failing to receive feedback 142, the primary control circuitry 221 discontinues pulsing switch circuitry 231 to store energy in the primary winding 131.

At time T2, subsequent to the mode change, the secondary switch circuitry 222 repeatedly pulses (activates and then deactivates) the switch circuitry 232 in order to convey quanta of energy stored in the output capacitor circuit 294 through the secondary winding 132 and the primary winding 131 to convey respective energy 127 for storage in the input capacitor circuitry 293.

This repeated process of repeatedly pulsing the switch circuitry 232 subsequent to time T2 (and up to time T3 in FIG. 4) conveys energy 127 to the secondary winding back 131 to the primary winding 132 for storage in input capacitor circuitry 293, reducing the magnitude of output voltage 190 on the output capacitor circuitry 294 and increasing the voltage level of the input capacitor circuitry 293.

Accordingly, prior to time T1, the secondary control circuitry 222 controls a flow of current through the secondary winding 132 of the transformer circuitry 130 to receive the energy 126 in the forward energy transfer mode. In the reverse energy transfer mode, the secondary control circuitry 222 conveys the energy 127 (such as a portion of previously received energy 126) through the secondary winding 132 back through the primary winding 131 of the transformer circuitry 130 to reduce the magnitude of the output voltage 190. Thus, instead of needlessly dissipating excess energy 127 stored in the output capacitor circuitry 294, the energy 127 from the output capacitor circuitry 294 is conveyed through the transformer circuitry 130 and stored in the input capacitor circuitry 293 for later use.

As previously discussed, prior to time T1, the secondary control circuitry 222 utilizes the received energy 126 in the forward direction to maintain the magnitude of the output voltage at a first specified voltage level such as 20 VDC. At or around time T1, the secondary control circuit 222 receives input (such as a control command) indicating to produce the output voltage 190 at a second voltage level such as 5 V DC. The secondary control circuitry 222 initiates a transfer of (excess) energy 127 in the reverse direction over multiple cycles back through the transformer circuitry 130 to reduce the magnitude of the output voltage 190.

Note again that, in addition to a setpoint voltage change, the techniques of switching to the reverse energy transfer mode can be used to accommodate a change in current consumption by the load and maintain the magnitude of the output voltage at a desired voltage level.

Thus, any number of conditions can cause the power converter circuit 101 to switch to operation in the reverse energy transfer mode.

Figure 4:
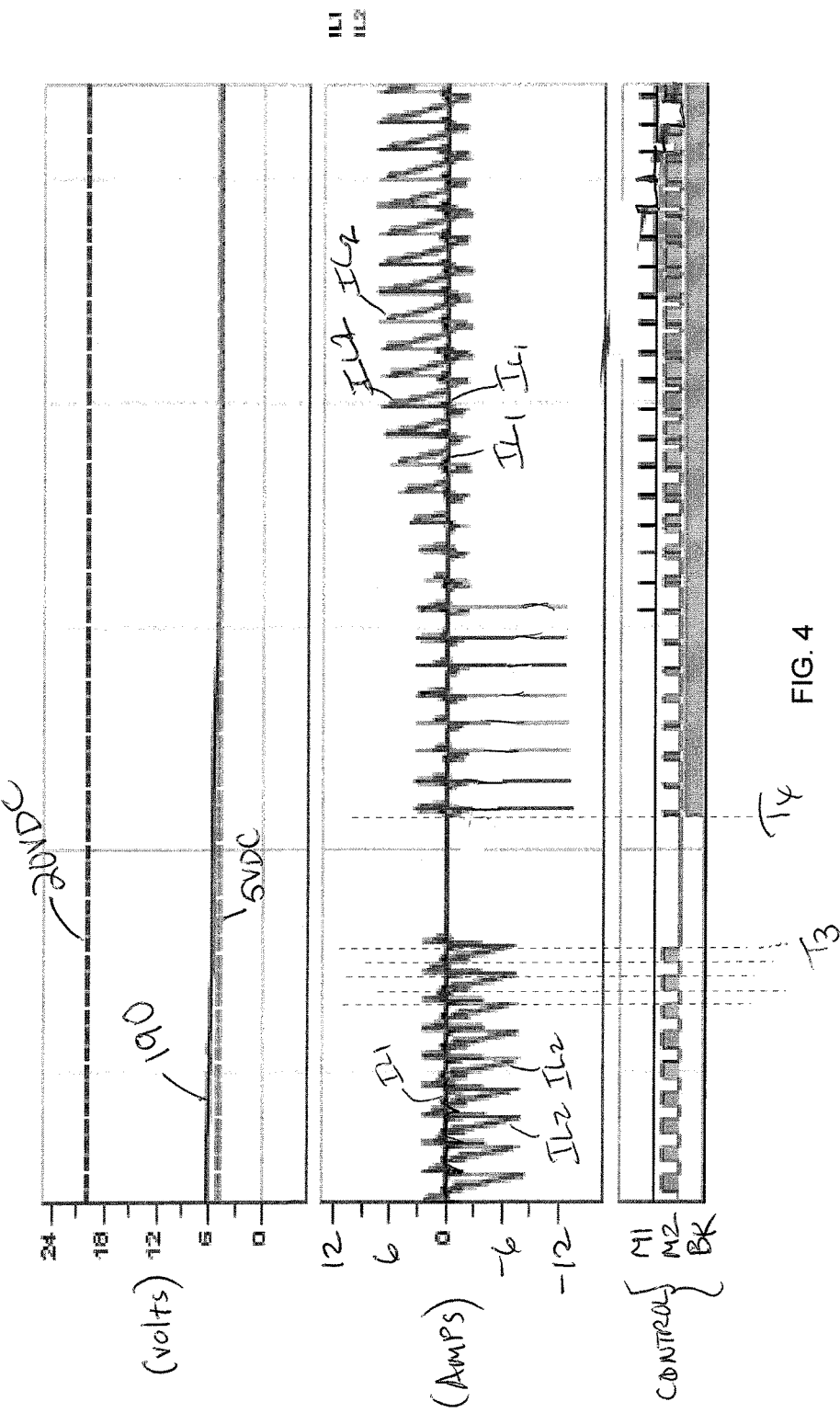
FIG. 4 is an example timing diagram illustrating transition of operating a power converter circuit from a reverse energy transfer mode to a forward energy transfer mode according to embodiments herein.

FIG. 4 is an example timing diagram illustrating transition from a reverse energy transfer mode to a forward energy transfer mode according to embodiments herein.

Between time T2 and time T3, the power converter circuit 101 operates in the reverse energy transfer mode.

As previously discussed, at or around time T2 (FIG. 3) and thereafter up to time T3 as shown in FIG. 4, the secondary control circuitry 222 repeatedly pulses energy 127 in multiple switching cycles in a reverse direction through the transformer circuitry 130 for storage in the input capacitor circuitry 293.

Further in this example embodiment, at or around time T3, the magnitude of the output voltage falls to a voltage level at or around the setpoint of 5 VDC. In such an instance, because the magnitude of the output voltage 190 is substantially around the new setpoint value of 5 VDC, the secondary control circuitry 222 discontinues switching activation of switch circuitry 232 to discontinue conveying energy from output capacitor circuitry 294 through the transformer circuitry 130. Discontinuing conveyance of energy pulses through the transformer circuitry 130 for one or more cycles or a predetermined duration notifies the primary control circuitry 221 to operate in the forward energy transfer mode again.

More specifically, in one embodiment the primary control circuitry 221 monitors the pulses of reverse energy 127 conveyed from the secondary control circuitry 222 back through the transformer circuitry 130 while power converter circuit 101 is in the reverse energy transfer mode. In response to detecting that the secondary control circuitry 222 discontinues conveying the energy in the reverse direction for a predetermined number of cycles (such as 5 cycles), at or around time T4, both the primary control circuitry 221 and secondary control circuitry 222 thereafter switch over to operation in the forward energy transfer mode in which the primary control circuitry 221 controls switch circuitry 231 to pulse current through the primary winding 131. The secondary control circuitry 222 controls switch circuitry 232 to receive the corresponding energy 126 and produce output voltage 190 to power the load 118.

It is further noted that at or around time T4, because the magnitude of the voltage is at the desired setpoint of 5 V DC, the secondary control circuitry 222 activates switch circuitry 233 in order to power the load 118 with the output voltage 190 (of 5 V DC). While at the 5 VDC output voltage level, and switch circuitry 233 ON, the load 118 consumes current Iout, reducing the magnitude of the output voltage 190. In response to consumption, subsequent to the magnitude of the output voltage 190 falling below the second voltage level of 5 VDC, the primary control circuitry 221 conveys additional energy 127 from the primary winding 131 through the secondary winding 132 in a manner as previously discussed to maintain the magnitude of the output voltage 190 at the (5 VDC level).

In one non-limiting example embodiment, the power converter circuit 100 supports USB-PD profiles or other quick-charging standards, where the magnitude of the output voltage 190 needs to change in accordance with an input signal indicating the setpoint of the output voltage. The above example illustrates how the power converter circuit 101 can be used initially (prior to time T1) to power a load such as a notebook computer requiring a 20 VDC output level. At or around time T1, the power converter circuit 101 receives an input signal indicating to operate at the 5 VDC output level to power a load such as a mobile phone device. In response to receiving the new setpoint value 5 VDC, at or around time T1, the power converter circuit 100 operates in the reverse energy transfer mode in order to reduce the magnitude of the output voltage 190 from the 20 VDC level to the 5 VDC level. Accordingly, an input command (received at or around time T1) indicating to operate at a new output voltage set point causes the power converter circuit 101 to operate in the reverse energy transfer mode to accommodate the voltage change.

Recall again that the power converter circuit 100 can operate in reverse energy transfer mode to accommodate transient load conditions as well.

Figure 5:
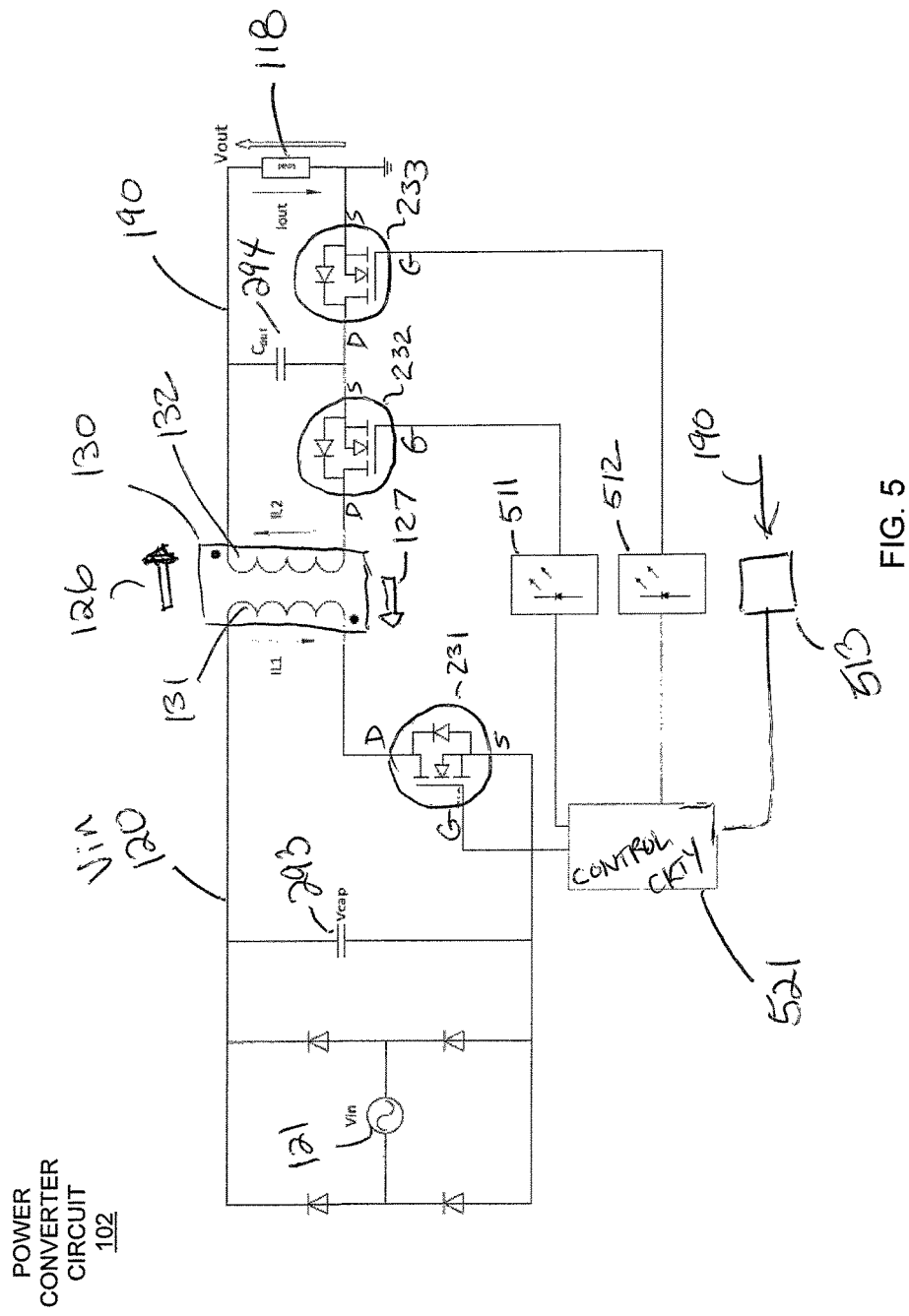
FIG. 5 is an example detailed diagram illustrating a power converter circuit including a transformer and corresponding circuitry according to embodiments herein.

FIG. 5 is an example detailed diagram illustrating a power converter circuit including a transformer and corresponding circuitry according to embodiments herein.

In this example embodiment, power converter circuit 102 is similar in many respects to power converter circuit 100 and power converter circuit 101 and includes transformer circuitry 130 including primary winding 131 and secondary winding 132.

Instead of separate controllers, as in the prior embodiments, this embodiment of the power converter circuitry 102 includes a single controller—controller 521 (control circuitry).

In general, during operation, the controller 521 monitors the output voltage 190 as feedback. In one embodiment, the feedback of the output voltage 190 is conveyed through the isolation device 513 to the controller 521. Isolation device 513 eliminates ground differences between circuitry on the primary side of the transformer circuit 130 and circuitry on the secondary side of the transformer circuitry 130.

Based on monitoring the magnitude of the output voltage 190, the control circuitry 521 controls operation of switch circuitry 231 as well as switch circuitry 232 and switch circuitry 233. As previously discussed, there may be ground differences between the primary side and the secondary side with respect to the transformer circuitry 130. To control switch circuitry 232, the control circuitry 521 conveys a respective control signal through the isolation device 511 to the gate of switch circuitry 232 (switch circuitry M2). Similarly, to control switch circuitry 233, the control circuitry 521 conveys a respective control signal through the isolation device 512 to the gate of switch circuitry 233 (switch circuitry BK).

As previously discussed, the switch circuitry 231 can be or include any suitable type of switch devices. In one embodiment, the switch circuitry 231 is a field effect transistor. However, note that the switch circuitry 231 can be any suitable device or combination of devices that control a flow of current through the primary winding 131.

Similarly, the switch circuitry 232 and/or switch circuitry 233 controlled by controller 521 can be or include any suitable type of one or more switch devices to control a flow of current through the secondary winding. In one embodiment, the switch circuitry 232 is a field effect transistor. However, as mentioned, the switch circuitry 232 and/or switch circuitry 233 can include any suitable device to control current flow.

During operation, and conveyance of energy 126 in a forward direction through the transformer circuitry 130, activation of the switch circuitry 231 (that is, turning switch circuitry 231 to an ON state) causes current to flow through the primary winding 131 as received from input voltage 120 (i.e., voltage on input capacitor 293 or from voltage source 121). Accordingly, in one embodiment, the input voltage 120 (such as a DC voltage derived from the rectification of the AC voltage outputted from voltage source 121) provides the energy 126 to input into the primary winding 131.

Note that the input voltage 120 can be received and/or derived from any suitable resource. In one embodiment, the input voltage 120 is a substantially DC voltage with AC ripple derived from full-wave rectification of an AC signal (such as an AC power signal from a wall receptacle, or Vin). Accordingly, the input voltage 120 can be susceptible to having anywhere from minimal to substantial ripple voltage.

As its name suggests, the dynamic load 118 is susceptible to consuming a varying amount of current over time. In this embodiment, the control circuitry 521 monitors a magnitude of the output voltage 190. During a condition in which the load 118 consumes more and more current over time, in which a magnitude of the output voltage 190 drops as detected by control circuitry 521, the control circuitry 521 inputs additional energy into the primary winding 131 during a next switching cycle (relative to a previous one or more switching cycles) to account for the increase in current consumption.

Conversely, during a condition in which the load 118 instantaneously consumes less current, in which a magnitude of the output voltage 190 may be increasing, the control circuitry 521 inputs a smaller amount of energy into the primary winding 131 on one or more next input cycles (with respect to the previous one or more switching cycles) to account for a decrease in current consumption.

As previously discussed, there are certain instances in which the merely reducing the amount of energy conveyed in the forward direction (from the primary winding 131 to the secondary winding 132) through the transformer circuitry 130 may not be sufficient to accommodate a transient current consumption condition and/or change in the desired setpoint voltage. As previously discussed, embodiments herein include conveying energy 127 (such as excess energy) in a reverse direction through the transformer circuitry 130 (i.e., from the secondary winding 132 to the primary winding 131) to maintain the magnitude of the output voltage 190 at a desired level.

As a specific example, assume that the control circuitry 521 detects a condition in which the magnitude of the output voltage 190 is sufficiently greater than a desired output voltage set point. As previously discussed this can be caused by a transient load condition in which the dynamic load 118 instantaneously consumes less current and/or the desired output voltage setpoint changes from the high voltage to a lower voltage. Embodiments herein include a way to provide a fast response for maintaining the output voltage at the desired output voltage set point. Further details of providing a fast response of maintaining the output voltage are discussed in the following figures.

Figure 6:
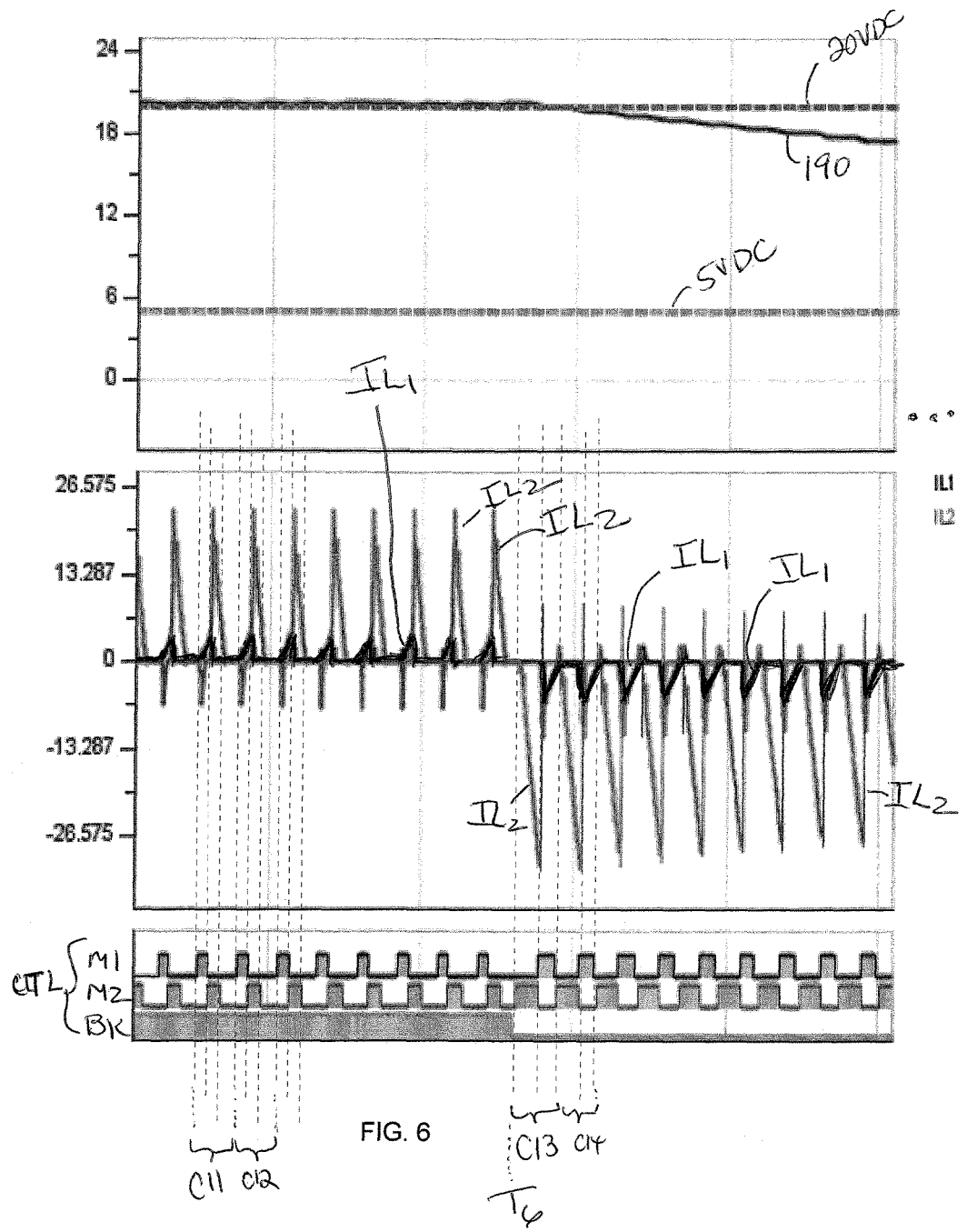
FIG. 6 is an example timing diagram illustrating transition of operating a power converter circuit from a forward energy transfer mode to a reverse energy transfer mode according to embodiments herein.

FIG. 6 is an example timing diagram illustrating transition from a forward energy transfer mode to a reverse energy transfer mode according to embodiments herein.

As shown, prior to time T6, the control circuitry 521 activates switch circuitry 233 (switch BK) over multiple switching cycles C11, C12, etc., such that the voltage on output capacitor circuitry 294 provides current to power the load 118. The energy 126 received through the transformer circuitry 130 over multiple switching cycles replenishes the energy stored in output capacitor circuitry 294 as the load 118 consumes corresponding current Iout.

Prior to time T6, the power converter circuit 100 operates in a forward energy transfer mode in which discrete quanta of energy in the switching cycles is transferred through the transformer circuitry 130 to produce the output voltage 190 to power the load 118. During each switching cycle in the forward energy transfer mode, the controller 521 activates switch circuitry 231 to an ON state while switch circuitry 232 is set to an OFF state. Activation of the switch circuitry 231 causes current IL1 to flow through the primary winding 131. This operation stores energy in the transformer circuitry 130. Subsequent to storing energy in the transformer circuitry 130, on a next portion of a switching cycle, the control circuitry 521 deactivates switch circuitry 231 to an OFF state and activates switch circuitry 232 to an ON state. Activation of switch circuitry 232 to the ON state causes the energy 126 stored in the transformer circuitry 131 to be conveyed through the secondary winding 132 to the output capacitor circuitry 294 (and/or load 118).

Accordingly, prior to time T6, when operating in the forward energy transfer mode, the primary control circuitry 221 pulses current through the primary winding 131 to convey the energy 126 to the secondary winding 132. The secondary control circuitry 222 receives the energy 126 through the secondary winding 132 to maintain the magnitude of the output voltage 190 at a desired setpoint voltage level such as 20 V DC.

At or around time T6, assume that the control circuitry 521 receives input indicating a change in the setpoint voltage from 20 VDC down to 5 VDC. In such an instance, there is a substantial amount of excess energy stored in the output capacitor circuitry 294.

In order to expediently regulate the output voltage 190 at 5 VDC instead of 20 VDC, embodiments herein include switching from operating in the forward energy transfer mode to a reverse energy transfer mode.

As previously discussed, the reverse energy transfer mode includes conveying energy 127 stored in output capacitor circuitry 294 in a reverse direction back through the transformer circuitry 130 for storage in input capacitor circuitry 293 (an energy storage circuit).

Accordingly, embodiments herein include conveying a previously received portion of energy 126 (such as a portion of energy 127) through the secondary winding 132 back to the primary winding 131 in response to detecting that the magnitude of the output voltage 190 is greater than a desired voltage regulation setpoint (such as new setpoint 5 VDC).

At or around time T6, the control circuitry 521 immediately deactivates switch circuitry 233 in response to receiving the input command to regulate at 5 VDC instead of 20 VDC. Deactivation of the switch circuitry 233 ensures that the load 118 is no longer powered.

Between time T6 and time T7 (in FIG. 7), the controller 521 discontinues pulsing switch circuitry 231 (via switching cycles C13, C14, etc.) to store energy in the primary winding 131. Instead, to operate in the reverse energy transfer mode at or around time T6, as shown in timing diagram 600 of FIG. 6, the control circuitry 521 operates in a reverse manner. For example, during each of multiple respective switching cycles between time T6 and T7, while the switch circuitry 231 is controlled to an OFF state, the controller 521 initially activates the switch circuitry 232 in a first part of a switching cycle, causing respective current IL2 to flow through a secondary winding 132. This causes energy stored in the output capacitor circuitry 294 to be conveyed to the transformer circuitry 130 through the secondary winding 132.

For a second part of a respective switching cycle while in the reverse energy transfer mode, the control circuitry 521 activists respective switch circuitry 231 to an ON state while switch circuitry 232 is set to an OFF state. The flow of energy 127 from the output capacitor circuitry 294 through the transformer circuitry 130 reduces the magnitude of the output voltage 190 stored on the output capacitor circuitry 294. During each second portion of a respective switching cycle between times T6 and T7, the control circuitry 521 controls switch circuitry 232 to an OFF state and activates switch circuitry 231 to an ON state. This causes the energy 127 stored in the transformer circuitry 130 to be conveyed through the secondary winding 131 to the input capacitor circuitry 293. Each cycle of conveying quanta of energy 127 in the reverse direction to the transformer circuitry to the input capacitor circuitry 293 causes the voltage on the input capacitor circuitry 293 to increase, storing the respective energy 127 for later use.

Accordingly, prior to time T6, the control circuitry 521 controls a flow of current IL2 through the secondary winding 132 of the transformer circuitry to receive the energy 126 in the forward energy transfer mode. In the reverse energy transfer mode, the control circuitry 521 conveys the energy 127 through the secondary winding 132 back through the primary winding 131 of the transformer circuitry 130 to input capacitor circuitry 293 to reduce the magnitude of the output voltage 190. Thus, instead of needlessly dissipating excess energy 127 stored in the output capacitor circuitry 294 because the magnitude of the output voltage 190 is to high, the energy 127 from the output capacitor circuitry 294 is conveyed in a reverse direction through the transformer circuitry 130 and stored in the input capacitor circuitry 293 for later use.

As previously discussed, to summarize above embodiments, prior to time T6, the controller 521 utilizes the received energy 126 in the forward direction to maintain the magnitude of the output voltage 190 at a first specified voltage level such as 20 VDC. At or around time T6, the controller 521 receives input indicating to produce the output voltage 190 at a second voltage level such as 5 VDC. The controller 521 initiates a transfer of excess energy 127 in the reverse direction back through the transformer circuitry 130 to reduce the magnitude of the output voltage 190 to the appropriate level such as 5 V DC.

Note again that the techniques of switching to the reverse energy transfer mode can be used to accommodate a change in current consumption by the load and maintain the magnitude of the output voltage at a desired voltage level. Thus, any number of conditions (such as a change in the setpoint voltage, change in current consumption by load 118, etc.) can cause the power converter circuit 102 to switch to operation in the reverse energy transfer mode.

Figure 7:
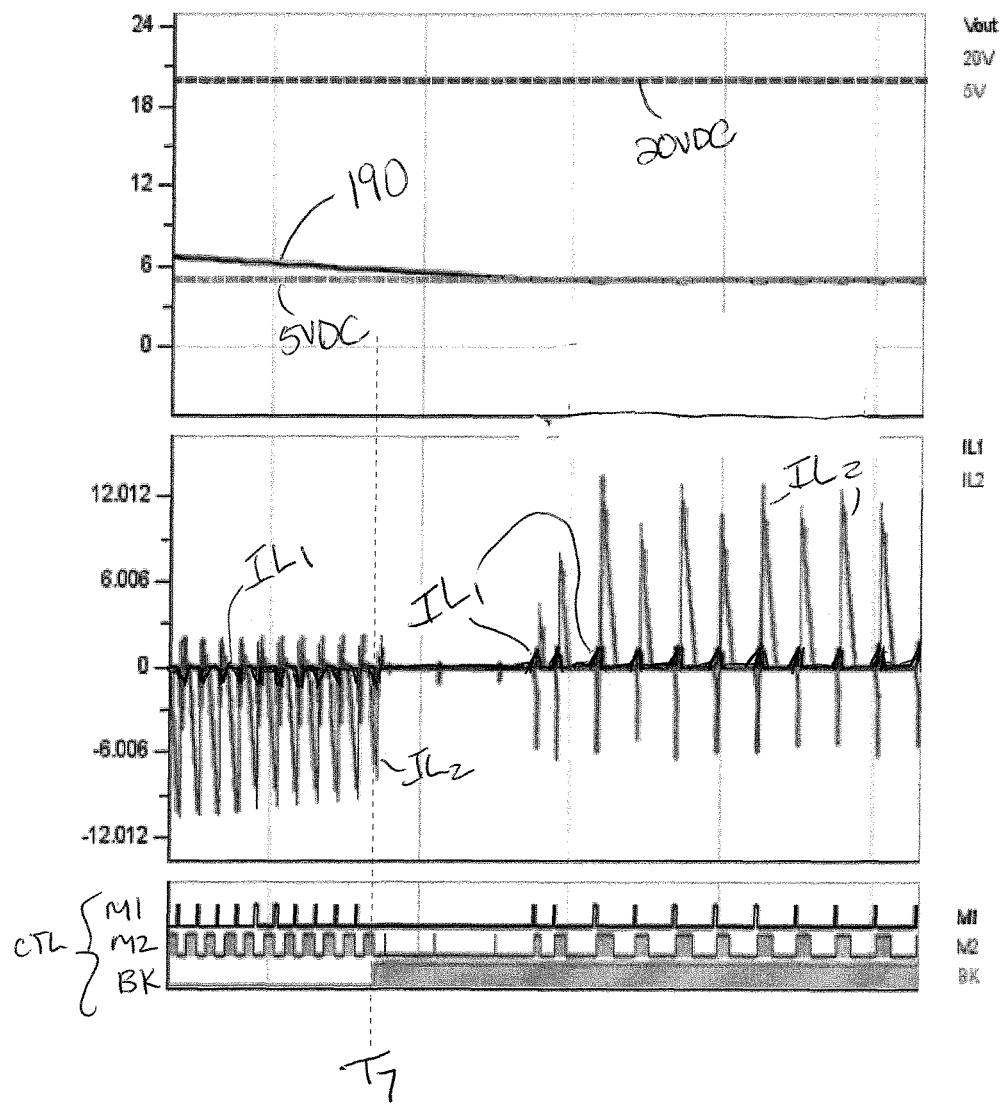
FIG. 7 is an example timing diagram illustrating transition of operating a power converter circuit from a reverse energy transfer mode to a forward energy transfer mode according to embodiments herein.

FIG. 7 is an example timing diagram illustrating transition from a reverse energy transfer mode to a forward energy transfer mode according to embodiments herein.

In a manner as previously discussed, between time T6 and T7, the power converter circuit 101 operates in the reverse energy transfer mode to regulate the magnitude of the output voltage 190 at the desired level.

More specifically, as previously discussed, at or around time T6 and thereafter in FIG. 6, the control circuitry 521 repeatedly pulses energy 127 in a reverse direction through the transformer circuitry 130 for storage in the input capacitor circuitry 293. Further in this example embodiment, at or around time T7, the magnitude of the output voltage falls to a voltage level at or around the setpoint of 5 VDC. In such an instance, because the magnitude of the output voltage 190 is substantially around the new setpoint value of 5 VDC, the controller 521 discontinues operating in the reverse energy transfer mode in which the control circuitry 521 conveys energy from output capacitor circuitry 294 through the transformer circuitry 130 to the input capacitor circuitry 293.

It is further noted that at or around time T7, because the magnitude of the voltage has been reduced to the desired setpoint of 5 VDC, the control circuitry 521 activates switch circuitry 233 in order to power the load 118 with the output voltage 190 (of 5 VDC).

While at the 5 VDC output voltage level, the load 118 consumes current Iout, reducing the magnitude of the output voltage 190 (such as below the 5 V DC setpoint). Subsequent to the magnitude of the output voltage 190 falling below the second voltage level of 5 VDC, the controller 521 operates in the forward energy transfer mode to convey additional energy 126 (such as energy stored in the input capacitor circuitry 293 or as received from the input voltage source 121) from the primary winding 131 through the secondary winding 132 in a manner as previously discussed to maintain the magnitude of the output voltage 190 at the (5 VDC level).

In a similar manner as previously discussed, the power converter circuit 101 can be configured to support USB-PD profiles or other quick-charging standards, where the magnitude of the output voltage needs to change in accordance with new settings as specified by an input control signal. The above example illustrates how the power converter circuit 102 can be used initially (prior to time T1) to power a load such as a notebook computer requiring a 20 VDC output level. At or around time T6, the power converter circuit 102 receives an input signal indicating to operate at the 5 VDC output level to power a load such as a mobile phone device. In response to receiving the new setpoint value 5 VDC, at or around time T6, the power converter circuit 101 operates in the reverse energy transfer mode up to time T7 in order to reduce the magnitude of the output voltage 190 from the 20 VDC level to the 5 VDC level.

Accordingly, an input command indicating to operate at a new output voltage set point causes the power converter circuit 102 to operate in the reverse energy transfer mode to accommodate the voltage change. Recall again that the power converter circuit 101 can operate in reverse energy transfer mode to accommodate transient load conditions as well.

Figure 8:
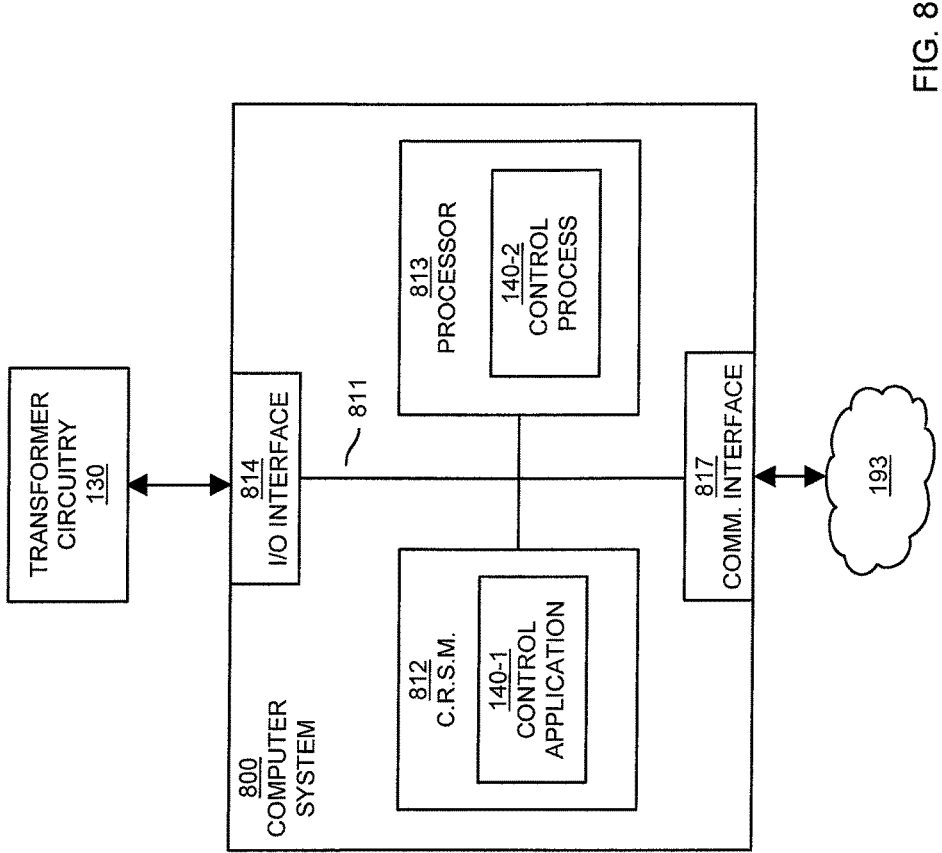
FIG. 8 is an example diagram illustrating computer processor hardware and related software to execute methods according to embodiments herein.

FIG. 8 is an example block diagram of a computer device for implementing any of the operations as discussed herein according to embodiments herein.

As shown, computer system 800 such as in primary circuit 121 and/or secondary circuit 122 of the present example includes an interconnect 811 that couples computer readable storage media 812 such as a non-transitory type of media (i.e., any type of hardware storage medium) in which digital information can be stored and retrieved, a processor 813 (e.g., computer processor hardware such as one or more processor devices), I/O interface 814, and a communications interface 817.

I/O interface 814 provides connectivity to any suitable circuitry such as primary winding 131, secondary winding 132, switch circuitry 231, switch circuitry 232, switch circuitry 233, etc. The connectivity enables the control application 140-1 to control operation of the respective power converter circuit.

Computer readable storage medium 812 can be any hardware storage resource or device such as memory, optical storage, hard drive, floppy disk, etc. In one embodiment, the computer readable storage medium 812 stores instructions and/or data used by the control application 140-1 to perform any of the operations performed by primary control circuitry 521, secondary control circuitry 522, primary circuit 121, secondary circuit 122, etc.

Further in this example embodiment, communications interface 817 enables the computer system 800 and processor 813 to communicate over a resource such as network 193 to retrieve information from remote sources and communicate with other computers.

As shown, computer readable storage media 812 is encoded with control application 140-1 (e.g., software, firmware, etc.) executed by processor 813. Control application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812.

Execution of the control application 140-1 produces processing functionality such as control process 140-2 in processor 813. In other words, the control process 140-2 associated with processor 813 represents one or more aspects of executing control application 140-1 within or upon the processor 813 in the computer system 150.

In accordance with different embodiments, note that computer system may be a micro-controller device configured to control a power supply and perform any of the operations as described herein.

Functionality supported by the different resources will now be discussed via flowcharts in FIGS. 9-10. Note that the steps in the flowcharts below can be executed in any suitable order.

Figure 9:
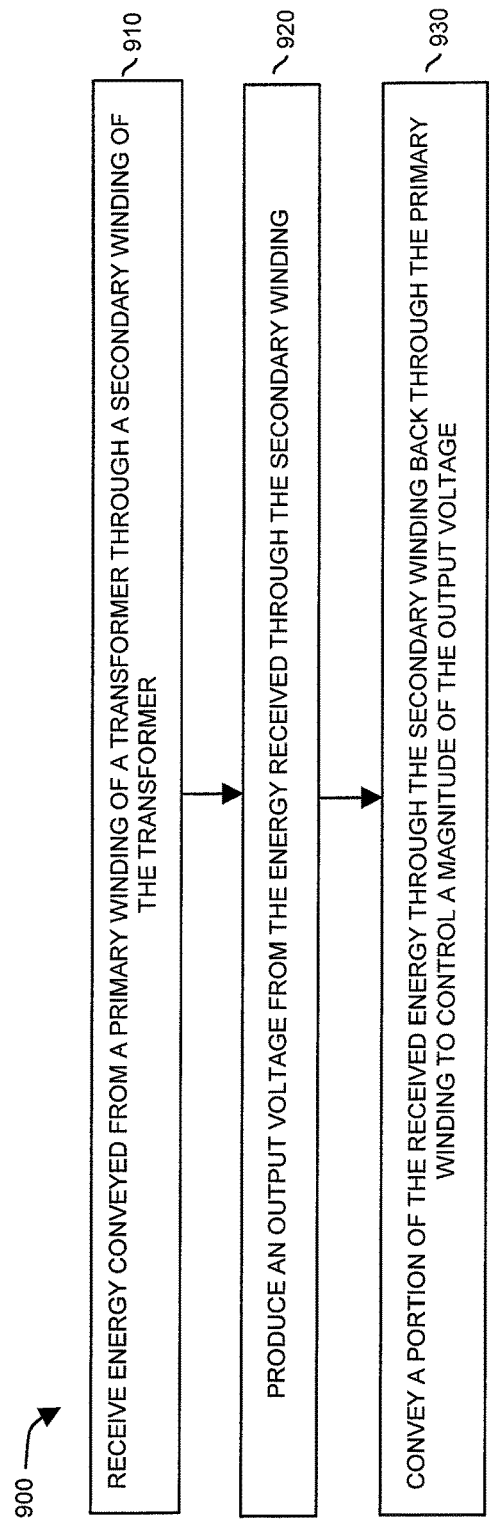

FIG. 9 is a flowchart 900 illustrating an example method according to embodiments. Note that there will be some overlap with respect to concepts as discussed above.

In processing operation 910, the secondary circuit 121 receives energy 126 conveyed from primary winding 131 of transformer circuitry 130 through the secondary winding 132 of the transformer circuitry 130.

In processing operation 920, the secondary circuit 122 produces an output voltage 190 from the energy 126 received through the secondary winding 132.

In processing operation 930, the secondary circuit 122 conveys energy 127 (such as excess energy or a portion of the previously received energy 126) through the secondary winding 132 back through the primary winding 131 to control a magnitude of the output voltage 190.

FIG. 10 is a flowchart 1000 illustrating an example method according to embodiments herein. Note that there will be some overlap with respect to concepts as discussed above.

In processing operation 1010, the secondary control circuitry 222 (or control circuitry 521) controls a flow of current (IL2) through the secondary winding 132 of the transformer circuitry 130 to receive energy 126 inputted to the primary winding 131.

In processing operation 1020, the secondary control circuitry 222 produces an output voltage 190 from the energy 126 received through the secondary winding 132.

In processing operation 1030, the secondary control circuitry 222 utilizes the output voltage 190 to power the load 118.

In processing operation 1040, the secondary control circuitry 222 (or control circuitry 521) compares the magnitude of the output voltage 190 to a desired setpoint voltage.

In processing operation 1050, the secondary control circuitry 222 (or control circuitry 521) detects that the magnitude of the output voltage 190 is greater than the desired setpoint.

In processing operation 1060, the secondary control circuitry 222 (or control circuitry 521) conveys (such as via pulsing of current through the secondary winding 132) the energy 127 (such as a portion of the received energy 126) through the secondary winding 132 back through the primary winding 131 of the transformer circuitry 130 to control a magnitude of the output voltage 190 to the desired setpoint. In one embodiment, the energy 127 is conveyed in response to detecting that the magnitude of the output voltage 190 is greater than a desired output voltage setpoint. As discussed herein, conveyance of the energy 127 through the transformer circuitry 132 to the storage resource such as one or more to reduce the magnitude of the output voltage 190.

Note again that techniques herein are well suited for use in power converter circuit applications such as those that implement a transformer supporting conveyance of energy in multiple directions through multiple inductively coupled windings. In other words, embodiments herein include providing voltage regulation based upon bi-directional flow of energy through a respective transformer. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving energy conveyed from a primary winding of a transformer through a secondary winding of the transformer;
producing an output voltage from the energy received through the secondary winding;
detecting a condition of excess energy being received through the secondary winding from the primary winding; and
conveying the excess energy through the secondary winding back through the primary winding to control a magnitude of the output voltage, conveyance of the excess energy through the secondary winding back to the primary winding maintaining the magnitude of the output voltage within a desired voltage range.

2. The method as in claim 1 further comprising:
utilizing the output voltage to power a load; and
conveying the excess energy through the secondary winding back to the primary winding to accommodate a change in current consumption by the load and maintain the magnitude of the output voltage.

3. The method as in claim 1 further comprising:
conveying the excess energy through the secondary winding back to the primary winding in response to detecting that the magnitude of the output voltage is greater than a desired output voltage setpoint.

4. The method as in claim 1, wherein receiving the energy includes controlling a flow of current through the secondary winding of the transformer to receive the energy, the method further comprising:
conveying the excess energy through the secondary winding back through the primary winding of the transformer to reduce the magnitude of the output voltage.

5. The method as in claim 4 further comprising:
conveying the excess energy to the secondary winding back to the primary winding in response to receiving a control signal indicating to reduce the magnitude of the output voltage.

6. The method as in claim 1, wherein the primary winding is controlled by first control circuitry, the secondary winding controlled by second control circuitry, the method further comprising:
via the first control circuitry:
pulsing first current through the primary winding to convey the energy to the secondary winding;
via the second control circuitry:
receiving the energy through the secondary winding to increase the magnitude of the output voltage.

7. The method as in claim 6 further comprising:
via the second control circuitry:
pulsing second current through the secondary winding to convey the excess energy to the primary winding;
via the first control circuitry:
receiving the excess energy through the primary winding.

8. The method as in claim 1, wherein conveying the excess energy through the secondary winding back through the primary winding to control the magnitude of the output voltage includes:
pulsing current through the secondary winding.

9. The method as in claim 1, wherein conveyance of the excess energy through the secondary winding back to the primary winding reduces the magnitude of the output voltage.

10. The method as in claim 9 further comprising:
storing the excess energy conveyed through the secondary winding back to the primary winding in energy storage hardware coupled to the primary winding.

11. The method as in claim 1 further comprising:
initiating conveyance of the excess energy through the secondary winding back to the primary winding to accommodate a transient load condition in which a load powered by the output voltage consumes less current.

12. The method as in claim 1 further comprising:
initiating conveyance of the excess energy through the secondary winding back to the primary winding when reducing an amount of energy conveyed in a forward direction from the primary winding to the secondary winding is not sufficient to accommodate the transient load condition.

13. The method as in claim 1 further comprising:
storing the excess energy in respective energy storage hardware coupled to the primary winding; and
subsequent to the storing, conveying the excess energy from the energy storage hardware through the primary winding to the secondary winding to produce the output voltage.

14. A method comprising:
receiving energy conveyed from a primary winding of a transformer through a secondary winding of the transformer;
producing an output voltage from the energy received through the secondary winding;
conveying a portion of the received energy through the secondary winding back through the primary winding to control a magnitude of the output voltage;
utilizing the received energy to maintain the magnitude of the output voltage at a first specified voltage level;
receiving input indicating to produce the output voltage at a second voltage level, a magnitude of the second voltage level less than a magnitude of the first voltage level; and
in response to receiving the input, conveying the portion of the received energy to the secondary winding back to the primary winding to reduce the magnitude of the output voltage.

15. The method as in claim 14 further comprising:
conveying additional energy from the primary winding through the secondary winding to maintain the magnitude of the output voltage at the second voltage level subsequent to conveying the portion of the received energy to the secondary winding back to the primary winding.

16. A method comprising:
receiving energy conveyed from a primary winding of a transformer through a secondary winding of the transformer;
producing an output voltage from the energy received through the secondary winding;
conveying a portion of the received energy through the secondary winding back through the primary winding to control a magnitude of the output voltage; and
subsequent to receiving the energy through the secondary winding, and prior to conveying the portion of the received energy through the secondary winding back to the primary winding, providing notification to a respective controller controlling operation of the primary winding to discontinue inputting energy in the primary winding.

17. The method as in claim 16 further comprising:
receiving the energy at the secondary winding subsequent to providing control command feedback transmitted through the secondary winding to the primary winding to the controller; and
wherein providing the notification to the controller includes discontinuing transmitting the control command feedback through the secondary winding to the primary winding for multiple cycles.

18. An apparatus comprising:
a transformer including a primary winding and a secondary winding;
control circuitry to control the primary winding and the secondary winding of the transformer;
the control circuitry operable to:
convey energy from the primary winding of the transformer through a secondary winding of the transformer, the energy used to produce an output voltage to power a load; and
convey an excess portion of the received energy through the secondary winding back to the primary winding to regulate a magnitude of the output voltage.

19. The apparatus as in claim 18, wherein the control circuitry includes a controller coupled to the secondary winding to monitor and regulate the magnitude of the output voltage, the controller operable to:
determine the excess portion; and
convey the excess portion of the received energy through the secondary winding back to the primary winding in response to detecting that the magnitude of the output voltage is greater than a desired voltage level.

20. The apparatus as in claim 18, wherein the control circuitry is further operable to:
control a flow of current through the secondary winding of the transformer to receive the energy; and
convey the excess portion of the received energy through the secondary winding back through the primary winding of the transformer to reduce the magnitude of the output voltage.

21. The apparatus as in claim 20, wherein the control circuitry is further operable to:
convey the excess portion of the received energy to the secondary winding back to the primary winding in response to receiving a control signal indicating to reduce the magnitude of the output voltage.

22. The apparatus as in claim 18, wherein the control circuitry is further operable to:
pulse current through the secondary winding to convey the excess portion of energy to the primary winding.

23. The apparatus as in claim 18, wherein the control circuitry includes first control circuitry to control the primary winding and second control circuitry to control the secondary winding;
wherein the primary winding is controlled by first control circuitry, the secondary winding controlled by second control circuitry;
wherein the first control circuitry is further operable to:
pulse first current through the primary winding to convey the energy to the secondary winding;
via the second control circuitry:
receive the energy through the secondary winding to increase the magnitude of the output voltage.

24. The apparatus as in claim 23, wherein the second control circuitry is further operable to pulse second current through the secondary winding to convey the excess portion of energy to the primary winding; and
wherein an input capacitor coupled to the primary winding receives and stores the excess portion of energy.

25. The apparatus as in claim 24, wherein the second control circuitry is operable to provide notification to the first control circuitry to discontinue inputting energy to the primary winding through the transformer subsequent to receiving the energy through the secondary winding, and prior to conveying the excess portion of the received energy through the secondary winding back to the primary winding.

26. The apparatus as in claim 25, wherein the first control circuitry comprises a transistor being series-connected to control current through the primary winding.

27. The apparatus as in claim 24, wherein the second control circuitry receives the energy in response to providing feedback transmitted through the secondary winding to the primary winding to the first control circuitry; and
wherein the second control circuitry is operable to discontinue transmitting feedback through the secondary winding to the primary winding for multiple cycles to notify the first control circuitry of a mode change in which the second control circuitry conveys the excess portion of the received energy through the secondary winding back through the primary winding.

28. The apparatus as in claim 18, wherein the control circuitry includes first control circuitry to control the primary winding and second control circuitry to control the secondary winding; and
wherein the second control circuitry is operable to produce the output voltage to power the load; and
wherein the second control circuitry is operable to convey the excess portion of the received energy through the secondary winding back through the primary winding to accommodate a change in current consumption by the load and maintain the magnitude of the output voltage at a desired voltage level.

29. The apparatus as in claim 18, wherein the control circuitry includes a primary controller coupled to the primary winding and a secondary controller to monitor and regulate the magnitude of the output voltage, the secondary controller operable to initiate conveyance of the excess portion of the received energy through the secondary winding back to the primary winding to reduce the magnitude of the output voltage.

30. The apparatus as in claim 18, further comprising:
energy storage hardware coupled to the primary winding, the energy storage hardware operable to store the excess portion of the energy received at the primary winding.

31. The apparatus as in claim 30, wherein the control circuitry is further operable to:
convey the excess energy from the energy storage hardware through the primary winding to the secondary winding to produce the output voltage.

32. The apparatus as in claim 18, wherein the control circuitry is operable to:
convey the excess portion through the secondary winding back to the primary winding to accommodate a transient load condition in which a load powered by the output voltage consumes less current.

33. The apparatus as in claim 18, wherein the control circuitry includes first control circuitry to control the primary winding and second control circuitry to control the secondary winding; and
wherein the second control circuitry is operable to provide notification to the first control circuitry to discontinue inputting energy to the primary winding through the transformer subsequent to receiving the energy through the secondary winding, and prior to conveying the excess portion of the received energy through the secondary winding back to the primary winding.

34. An apparatus comprising:
a transformer including a primary winding and a secondary winding;
control circuitry to control the primary winding and the secondary winding of the transformer;
the control circuitry operable to:
convey energy from the primary winding of the transformer through a secondary winding of the transformer, the energy used to produce an output voltage to power a load; and
convey a portion of the received energy through the secondary winding back through the primary winding to control a magnitude of the output voltage;
where in the control circuitry is further operable to:
utilize the received energy to maintain the magnitude of the output voltage at a first specified voltage level;
receive input indicating to produce the output voltage at a second voltage level, a magnitude of the second voltage level less than a magnitude of the first voltage level; and
in response to receiving the input, convey the portion of the received energy to the secondary winding back to the primary winding to reduce the magnitude of the output voltage.

35. The apparatus as in claim 34, wherein the control circuitry is further operable to:

convey additional energy from the primary winding through the secondary winding to maintain the magnitude of the output voltage at the second voltage level.

36. Computer-readable storage media having instructions stored thereon, the instructions, when executed by computer processor hardware, cause the computer processor hardware to:

receive energy conveyed from a primary winding of a transformer through a secondary winding of the transformer;

produce an output voltage from the energy received through the secondary winding; and convey a portion of the received energy through the secondary winding back through the primary winding to regulate a magnitude of the output voltage, the conveyed portion being a message indicating an amount energy to forward through the primary winding to the secondary winding to regulate the magnitude of the output voltage.

* * * * *